(12) United States Patent
Winkler et al.

(10) Patent No.: US 6,218,479 B1
(45) Date of Patent: Apr. 17, 2001

(54) NONRIGID, THERMOPLASTIC MOULDING COMPOSITIONS

(75) Inventors: Jürgen Winkler, Langenfeld; Hans-Georg Hoppe, Leichlingen; Wolfgang Bräuer, Leverkusen; Hans-Georg Wussow, Düsseldorf, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/503,628

(22) Filed: Feb. 14, 2000

(30) Foreign Application Priority Data

Feb. 25, 1999 (DE) ............................................. 199 07 987

(51) Int. Cl.$^7$ .................................................. C08L 75/04
(52) U.S. Cl. ............................................. 525/458; 528/65
(58) Field of Search ........................ 525/458; 528/65, 528/76, 81

(56) References Cited

U.S. PATENT DOCUMENTS

| | | | |
|---|---|---|---|
| 3,642,964 | 2/1972 | Rausch, Jr. et al. | 264/40 |
| 5,288,549 | 2/1994 | Zeitler et al. | 428/318.6 |
| 5,795,948 | 8/1998 | Heidingsfeld et al. | 528/59 |
| 5,905,133 | 5/1999 | Muller et al. | 528/61 |

FOREIGN PATENT DOCUMENTS

| | | |
|---|---|---|
| 1236239 | 5/1988 | (CA) . |
| 1257946 | 7/1989 | (CA) . |
| 2154619 | 1/1996 | (CA) . |
| 1964834 | 7/1971 | (DE) . |
| 2901774 | 7/1980 | (DE) . |
| 1057018 | 2/1967 | (GB) . |

OTHER PUBLICATIONS

Annalen der Chemie, vol. 562, Dec. 1948, Von Werner Siefken, Mono– und Polysiocyanate pp. 6–136.

Kautschuk + Gummi—Kunststoffe, 35, No. 7/82 (date unavailable) Th. Timm, Hamburg–Harburg pp. 568–584 Derzeitige Erkenntnisse über physikalishe und chemische Vorgänge bei der thermischen und thermo–oxidativen Beanspruchung von Polyurethanelastomeren.

Kunststoffe 68 (month unavailable) 1978, 12, Goyert et al, pp. 819–825, Thermoplastische Polyurethan–Elastomere— Eigenschaften und Anwendungen.

*Primary Examiner*—Patricia A. Short
(74) *Attorney, Agent, or Firm*—Joseph C. Gil; Aron Preis

(57) ABSTRACT

This invention relates to thermoplastically processable, readily demouldable moulding compositions with low shrinkage and with a hardness of 65 to 85 Shore A, consisting of a mixture of A) a thermoplastic polyurethane of hardness 60 to 75 Shore A and B) a thermoplastic polyurethane of hardness 76 to 90 Shore A, which is produced continuously by a special multi-stage process.

3 Claims, No Drawings

NONRIGID, THERMOPLASTIC MOULDING COMPOSITIONS

This invention relates to nonrigid, readily demouldable moulding compositions which comprise thermoplastic polyurethanes and which exhibit low shrinkage.

Thermoplastic polyurethane elastomers (TPUs) have long been known. They are of industrial importance on account of their combination of high-grade mechanical properties with the known advantages which result from their capacity for being processed thermoplastically and hence inexpensively. A large range of variation of mechanical properties can be achieved by the use of different chemical synthesis components. A review on TPUs, their properties and applications is given in Kunststoffe 68 (1978), 819, and in Kautschuk, Gummi, Kunststoffe 35 (1982), 568, for example.

TPUs are synthesised from linear polyols, which are mostly polyester- or polyether polyols, and from organic diisocyanates and short-chain diols (chain extenders). Catalysts can also be added in order to speed up the formation reaction. The molar ratios of the synthesis components can be varied over a relatively large range in order to adjust the properties of the products formed. Molar ratios of polyols to chain extenders ranging from 1:1 to 1:12 have proved useful, and result in products with hardnesses within the range from 80 Shore A to 75 Shore D (according to DIN 53 505).

TPUs with a Shore A hardness less than 80 can theoretically be obtained in the same manner. A disadvantage here, however, is that these products can only be handled with difficulty during the production thereof, since they are difficult to set and solidify.

TPUs with hardnesses as low as this exhibit rubber-like elastic behaviour. Therefore, the behaviour on demoulding and the dimensional stability of injection moulded parts often render these materials inadequate for processing in the injection moulding industry, on account of their shrinkage being too high.

EP-A 0 134 455 discloses that TPUs with a hardness of 60 to 80 Shore A can be obtained by the use of plasticisers comprising special phthalates and phosphates.

EP-A 0 695 786 describes the production of nonrigid TPUs based on special polyether/polyester mixtures with plasticisers comprising alkylsulphonic acid esters or benzylbutyl phthalate, with the addition of inorganic fillers.

A disadvantage of both these processes is the use of plasticisers, which makes it impossible to use these TPUs for many applications in which what is important is the purity of the TPU material or the surface quality of the processed TPU.

The object of the present invention was therefore to provide TPU moulding compositions which are nonrigid, readily deformable and thermoplastically processable, and which exhibit low shrinkage and contain no plasticisers.

It has been possible to achieve this object by means of the TPUs according to the invention.

The present invention relates to a thermoplastically processable, readily demouldable polyurethane moulding composition with low shrinkage measured in accordance with DIN 16 770 (Part 3), of lower than 2.5% and with a hardness of 65 to 85 Shore A (as determined according to DIN 53 505), consisting of a mixture of A) 5 to 54 parts by weight of a thermoplastic polyurethane of hardness 60 Shore A to 75 Shore A (as determined according to DIN 53 505), obtainable from
  1) an organic diisocyanate,
  2) a polyester- and/or polyether polyol with a number average molecular weight between 500 and 5000 and
  3) a chain-extending diol with a molecular weight between 60 and 400, and B) 95–46 parts by weight of a thermoplastic polyurethane of hardness 76 Shore A to 90 Shore A (as determined according to DIN 53 505), obtainable from
  1) an organic diisocyanate,
  2) a polyester- and/or polyether polyol with a number average molecular weight between 500 and 5000 and
  3) a chain-extending diol with a molecular weight between 60 and 400, and
  4) optionally catalysts, adjuvant substances, additives, chain terminators and demoulding agents, wherein B) is obtained continuously by a multi-stage reaction, wherein a) one or more linear, hydroxyl-terminated polyester- and/or polyether polyols are continuously mixed, with a high level of shearing energy (sufficient to attain a good mixture of the components), with part of an organic diisocyanate in a ratio of 2.0:1 to 5.0:1, b) the mixture produced in stage a) is continuously reacted in a reactor at temperatures >120° C. up to a conversion >90% with respect to the polyol, to form an isocyanate-terminated prepolymer, c) the prepolymer produced in stage b) is mixed with the remainder of the organic diisocyanate (preferably the amount of the remainder is at least 2.5% of the amount of the organic diisocyanate of stage a)), wherein an NCO:OH ratio of 2.05:1 to 6.0:1 is set overall in stages a) to c) and an NCO:OH ratio of 0.9:1 to 1.1:1 is set taking into consideration all the components of stages a) to f), d) the mixture produced in stage c) is cooled to a temperature <190° C., e) the mixture obtained in stage d) is continuously and intensively mixed with one or more chain-extending diols for a maximum of 5 seconds, and f) the mixture obtained in stage e) is continuously reacted in an extruder to form the thermoplastic polyurethane.

Examples of suitable organic diisocyanates 1) include aliphatic, cycloaliphatic, araliphatic, heterocyclic and aromatic diisocyanates, such as those which are described in Justus Liebigs Annalen der Chemie, 562, pages 75 to 136.

In detail, the following examples should be cited: aliphatic diisocyanates such as hexamethylene diisocyanate, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate, as well as the corresponding mixtures of isomers, 4,4'-dicyclohexylmethane diisocyanate, 2,4'-dicyclohexylmethane diisocyanate and 2,2'-dicyclohexylmethane diisocyanate as well as the corresponding mixtures of isomers; aromatic diisocyanates such as toluene 2,4-diisocyanate, mixtures of toluene 2,4-diisocyanate and toluene 2,6-diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate; urethane-modified, liquid 4,4'-diphenylmethane diisocyanate or 2,4'-diphenylmethane diisocyanate, 4,4'-diisocyanatodiphenylethane (1,2) and 1,5-naphthalene diiso-cyanate. The following are preferred: 1,6-hexamethylene diiso-cyanate, 1,4-cyclohexane diisocyanate, isophorone diisocyanate, dicyclohexyl-methane diiso-cyanate, mixtures of diphenylmethane diisocyanate isomers with a 4,4'-diphenylmethane diisocyanate content of more than 96% by weight; particularly 4,4'- diphenylmethane diisocyanate and 1,5-naphthalene diisocyanate. The afore-mentioned diisocyanates can be used individually or in the form of mixtures with each other. They can also be used together with up to 15 mol % (based on the total diisocyanate) of a polyisocyanate. However, the maximum amount of polyisocyanate added must be such that a product is formed which is still thermoplastically processable. Examples of polyisocyanates include triphenyl-methane 4,4',4"-triisocyanate and polyphenyl-polymethylene polyisocyanate.

Linear, hydroxyl-terminated polyols with an average molecular weight $M_n$ of 500 to 5000 are preferred as component 2). Due to their method of production, these substances often contain small amounts of nonlinear compounds. Therefore, substances such as these are often also termed "substantially linear polyols". These are also suitable. Polyester-, polyether- or polycarbonate diols or mixtures thereof are preferably used.

Suitable polyether polyols (polyether diols) can be obtained by the reaction of one or more alkylene oxides containing 2 to 4 carbon atoms in their alkylene radical with a starter molecule which contains two active hydrogen atoms. Examples of alkylene oxides include: ethylene oxide, 1,2-propylene oxide, epichlorohydrin, 1,2-butylene oxide and 2,3-butylene oxide. Ethylene oxide, propylene oxide and mixtures of 1,2-propylene oxide and ethylene oxide are preferably used. The alkylene oxides can be used individually, alternately in succession, or as mixtures. Examples of suitable starter molecules include: water, amino alcohols such as N-alkyl-diethanolamines, for example N-methyl-diethanolamine, and diols such as ethylene glycol, 1,3-propylene glycol, 1,4-butanediol and 1,6-hexanediol. Mixtures of starter molecules can also optionally be used. Other suitable polyetherols are polymerisation products of tetrahydrofuran which contain hydroxyl groups. Trifunctional polyethers can also be used in proportions of 0 to 30% by weight with respect to the bifunctional polyethers. However, the maximum amount of trifunctional polyethers which is used must be such that a product is obtained which is still thermoplastically processable. The substantially linear polyether diols preferably have average molecular weights $M_n$ ranging from 500 to 5000. They can be used either individually or in the form of mixtures with each other.

Suitable polyester polyols (polyester diols) can be obtained, for example, from dicarboxylic acids comprising 2 to 12 carbon atoms, preferably 4 to 6 carbon atoms, and polyhydric alcohols. Examples of suitable dicarboxylic acids include: aliphatic dicarboxylic acids such as succinic acid, glutaric acid, adipic acid, suberic acid, azelaic acid and sebacic acid, or aromatic dicarboxylic acids such as phthalic acid, isophthalic acid and terephthalic acid. The dicarboxylic acids be used individually or as mixtures, e.g. in the form of a mixture of succinic, glutaric and adipic acids. Instead of dicarboxylic acids, it may be advantageous to use the corresponding dicarboxylic acid derivatives, such as dicarboxylic acid diesters comprising 1 to 4 carbon atoms in their alcohol radical, dicarboxylic anhydrides or dicarboxylic acid chlorides, for the production of the polyester diols. Examples of polyhydric alcohols include glycols comprising 2 to 10, preferably 2 to 6 carbon atoms, such as ethylene glycol, diethylene glycol, 1,4-butanediol, 1,5-pentanediol, 1,6-hexanediol, 1,10-decanediol, 2,2-dimethyl-1,3-propanediol, 1,3-propanediol and dipropylene glycol for example. Depending on the desired properties, these polyhydric alcohols can be used on their own or in admixture with each other. Esters of carbonic acid with said diols are also suitable, particularly those comprising 4 to 6 carbon atoms, such as 1,4-butanediol or 1,6-hexanediol, condensation products of ω-hydroxycarboxylic acids such as ω-hydroxycaproic acid, or polymerisation products of lactones, such as ω-caprolactones, which are optionally substituted. Ethanediol polyadipates, 1,4-butanediol polyadipates, ethanediol-1,4-butanediol polyadipates, 1,6-hexanediol-neopentylglycol polyadipates, 1,6-hexanediol-1,4-butanediol polyadipates and polycaprolactones are preferably used as polyester diols. The polyester diols have average molecular weights $M_n$ of 500 to 5000 and can be used individually or in the form of mixtures with each other.

The chain extenders 3) which are used are diols and perhaps diols and small amounts of diamines with a molecular weight of 60 to 400, preferably aliphatic diols comprising 2 to 14 carbon atoms, such as ethanediol, 1,6-hexanediol, diethylene glycol, dipropylene glycol and particularly 1,4-butanediol. However, the maximum amount of diamines which is used must be such that a product is obtained which is still thermoplastically processable. Chain extenders which are also suitable include diesters of terephthalic acid with glycols comprising 2 to 4 carbon atoms, e.g. terephthalic acid-bis-ethylene glycol or terephthalic acid-bis-1,4-butanediol, hydroxyalkylene ethers of hydroquinone e.g. 1,4-di(β-hydroxyethyl)-hydroquinone, ethoxylated bisphenols, e.g. 1,4-di(β-hydroxyethyl)-bisphenol A, (cyclo) aliphatic diamines such as isophoronediamine, ethylenediamine, 1,2-propylenediamine, 1,3-propylenediamine, N-methyl-propylene-1,3-diamine or N,N'-dimethylethylene-diamine, and aromatic diamines such as 2,4-diaminotoluene, 2,6-diaminotoluene, 3,5-diethyl-2,4-diaminotoluene or 3,5-diethyl-2,4-diaminotoluene, or primary mono-, di-, tri- or tetraalkyl-substituted 4,4'-diaminodiphenylmethanes. Ethanediol, 1,4-butanediol, 1,6-hexanediol, 1,4-di(β-hydroxyethyl)-hydroquinone or 1,4-di(β-hydroxyethyl)-bisphenol A are preferably used as chain extenders. Mixtures of the aforementioned chain extenders can also be used. Moreover, smaller amounts of triols can also be added. However, the maximum amount of triols which is used must be such that a product is obtained which is still thermoplastically processable.

Customary monofunctional compounds can also be added in small amounts, e.g. as chain terminators or demoulding agents. Examples thereof include alcohols such as octanol and stearyl alcohol or amines such as butylamine and stearylamine.

TPUs can be obtained from the aforementioned synthesis components, optionally in the presence of catalysts, adjuvant substance and/or additives. The synthesis components are reacted in amounts such that the equivalent ratio of NCO groups to the sum of the groups which are reactive towards NCO, particularly the OH groups of low molecular weight diols/triols and polyols, is 0.9:1.0 to 1.1:1.0. Preferably 0.95:1.0 to 1.10:1.0.

Suitable catalysts include the customary tertiary amines which are known from the prior art, such as triethylamine, dimethylcyclohexylamine, N-methylmorpholine, N,N'-dimethylpiperazine, 2-(dimethylamino-ethoxy)ethanol, diazabicyclo[2.2.2]-octane and the like, as well as organic compounds of metals in particular, such as esters of titanic acid, iron compounds, or tin compounds such as tin diacetate, tin dioctoate, tin dilaurate or tin dialkyl salts of aliphatic carboxylic acids, such as dibutyltin diacetate or dibutyltin dilaurate or the like. The preferred catalysts are organic compounds of metals, particularly esters of titanic acid, iron compounds and tin compounds.

Examples of suitable adjuvant substances include internal lubricants such as esters of fatty acids, metal soaps thereof, fatty acid amides, fatty acid ester amides and silicone compounds, anti-seizing agents, inhibitors, stabilisers against hydrolysis, light, heat and discoloration, flame retardants, colorants, pigments, inorganic and/or organic fillers and reinforcing agents. In particular, reinforcing agents include fibrous reinforcing materials such as inorganic fibres, for example, which are produced according to the prior art and which may also be coated with a size. Further details of the aforementioned adjuvant substances and additives are given in the specialist literature, for example in the monograph by J. H. Saunders and K. C. Frisch "High Polymers", Volume XVI, Polyurethanes, Parts 1 and 2, Interscience Publishers 1962 and 1964, respectively, and in the Taschenbuch für Kunststoff-Additive by R.Gachter and H. Müller (Hanser Verlag Munich 1990) or in DE-A 29 01 774.

Other additives which can be contained in the TPU include thermoplastics, for example polycarbonates and acrylonitrile/butadiene/styrene terpolymers, particularly ABS. Other elastomers can also be contained, such as rubber, ethylene/vinyl acetate copolymers, styrene/butadiene copolymers, and other TPUs. Other materials which are suitable for processing include commercially available plasticisers such as phosphates, phthalates, adipates, sebacates and alkylsulphonic acid esters.

TPU A) ("the nonrigid component") is obtained by adjusting the molar ratio of polyol to chain extender to give a Shore A hardness of 60 to 75, preferably 65 to 70.

TPU A) can be produced batch-wise or continuously. The best-known industrial production processes therefor are the belt process (GB-A 1 057 018) and the extruder process (DE-A 1964 834, DE-A 2 059 570 and US-A 5 795 948).

TPU B) ("the rigid component") is likewise obtained by adjusting the molar ratio of polyol to chain extender to give a Shore A hardness of 76 to 90, preferably 82 to 88.

TPU B) is produced continuously in a multi-stage process (analogous to EP-A 0 816 407) as follows:

The amounts of reaction components for the formation of the prepolymer in stage b) are selected so that the NCO/OH ratio of portion 1 of diisocyanate 1) and polyol 2) is 2.0:1 to 5.0:1, preferably 2.05:1 to 3.0:1. The components are continuously mixed in a processing unit which provides a high level of shearing energy. A mixer head, preferably a high speed toothed roll mixer, a static mixer or a jet mixer can be used, for example.

The prepolymer reaction in stage b) is conducted continuously in a reactor, for example in a tube. A tube comprising static mixers, or a stirred tube (tube mixer) with a length/diameter ratio higher than 4:1, is preferably used.

In one particular preferred embodiment, stages a) and b) are effected in jet/tube apparatuses fitted with static mixers, or in a tube mixer.

According to the invention, the prepolymer reaction in stage b) should be carried out to obtain a substantially complete conversion, i.e. to more than 90 mol % conversion, with respect to the polyol. The reaction temperatures are above 120° C., preferably between 140° and 220° C.

In stage c), portion 2 of diisocyanate 1) is rapidly admixed. One or more static mixers in a tube are preferably used for this purpose. A jet mixer, a mixer head, or the mixing elements of an extruder can also be used, however.

The mixture produced in stage c) is cooled in stage d) to a temperature below 190° C., preferably below 170° C. A tube, which is cooled if necessary, or a cooled part of an extruder which is fitted with feeder elements, are again suitable for this purpose. Cooling is preferably effected in an externally cooled twin-shaft extruder.

In stage e), chain extender 3) is admixed with the cooled prepolymer mixture in less than 5 seconds. A mixer unit which operates with a high level of shearing energy is also preferred for this stage. Examples thereof include a mixer head, a mixer jet or a high-speed worm extruder of small volume. Intensive mixing is preferably effected by the mixer elements of an extruder.

In stage f) is the reaction mixture is continuously reacted in an extruder, for instance a twin-screw extruder to form a thermoplastic polyurethane. The reaction temperature is 140° C. to 250° C. In the course of this procedure, the housing of the extruder is either heated, or, in a second variant, is neither heated nor cooled, which simply results in the radiation of heat to the surroundings. This type of temperature control is termed "quasi-adiabatic".

TPUs A) (nonrigid) and B) (rigid) can be mixed in commercially available granule mixers to form the moulding composition according to the invention. It is also possible, however, to mix TPUs A) and B) by conventional thermoplastic procedures in the melt, e.g. by extrusion, and thus to convert them into a uniform granular material, before the actual further processing stage.

The moulding compositions according to the invention are very soft (65 to 85 Shore A) and exhibit good mechanical properties. When they are processed by injection moulding they are readily demouldable. Injection moulded parts made from them exhibit good dimensional stability due to the their low shrinkage.

The moulding compositions according to the invention are used for the production of nonrigid, flexible injection moulding parts, e.g. shoe soles, handle covers, expanding bellows and dust caps, and for the production of extruded articles such as flat sheets, films and sections. The moulding compositions can also be processed in combination with other thermoplastics by multi-component injection moulding and/or by coextrusion.

The invention is explained in more detail with reference to the following examples.

EXAMPLES

Process 1: Static Mixer/ZSK Multi-stage Process

The polyester, in which 150 ppm (with respect to the polyester) of tin dioctoate had been dissolved as a catalyst, was heated to 1 50° C. and was continuously metered into a static mixer (manufactured by Sulzer). Portion 1 (2.45 mol) of 4,4'-diphenylmethane diisocyanate (60° C.) was simultaneously pumped into the static mixer. 99% conversion (with respect to the polyester) to prepolymer occurred in about 30 seconds in the static mixer. Portion 2 (1.09 mol) of the 4,4'-diphenylmethane diisocyanate was admixed with the prepolymer over 5 seconds by means of a second static mixer (manufactured by Sulzer). The reaction mixture was metered into housing 1 of a ZSK 83 (manufactured by Werner & Pfleiderer) and was cooled there in the following housing to about 140° C. 0.4% by weight (with respect to TPU) of bis-ethylene-stearylamide were added to housing 1. 1,4-butanediol was added to housing 5, and was admixed with the prepolymer-MDI mixture by means of a short mixer element with an intensive mixing action situated below housing 6.

The reaction components were then reacted to form TPU in the last part of the extruder. The reaction temperature ranged from 150 to 220° C. The speed of rotation of the worm was 300 rpm.

At the end of the extruder, the hot melt was taken off as a strand, and was cooled in a water bath and granulated.

Process 2: Static Mixer Single-stage Process

The polyester was placed in a vessel with the butanediol and heated to about 200° C. and the mixture was continuously added, together with 4,4'-diphenylmethane diisocyanate which had been heated to 180° C., to a static mixer (manufactured by Sulzer). 250 ppm (with respect to the polyester) of tin dioctoate were dissolved as a catalyst in the polyester. Downstream of the static mixer, in which the dwell time was about 1 second, the product stream was fed into the first housing of a Welding extruder (temperature about 200° C.). 0.8% by weight (with respect to the TPU) of bisethylenestearylamide were simultaneously added thereto. The speed of rotation of the worm was 110 rpm. At the end of the extruder, the polymer melt was granulated by an underwater granulation device (manufactured by Gala).

Process 3: Mixer Head/belt Single Stage Process

The polyester, in which 150 ppm (with respect to the polyester) of tin dioctoate had been dissolved as a catalyst, was heated to 150° C., and was continuously mixed together with the butanediol and the 4,4'-diphenylmethane diisocyanate (60° C.) in a mixer head. The reaction mixture obtained was deposited directly on a conveyor belt, which passed continuously for about 3 minutes through a zone heated at 140° C. The melt which solidified at the end of the conveyor belt was drawn into a ZSK 83 (temperature: 140 to 200° C.). 0.4% by weight (with respect to the TPU) of bisethylenestearylamide was added to the middle of the extruder. The speed of rotation of the extruder was 300 rpm. At the end of the extruder, the hot melt was taken off as a strand, cooled in a water bath and granulated.

Process 4: ZSK Two-stage Process

The polyol, in which 150 ppm (with respect to the polyol) of tin dioctoate had been dissolved as a catalyst, was heated to 140° C. and was continuously added to the first housing of a ZSK 83 (manufactured by Werner/Pfleiderer). The total amount of 4,4'-diphenylmethane diisocyanate (60° C.) was added to the same housing. 1,4-butanediol was continuously fed to housing 7. The 13 housings of the ZSK were progressively heated from 140° C. 0 to 240° C. The speed of rotation of the worm was 300 rpm. The rate of addition was adjusted so that the dwell time of the reaction components in the ZSK was about 1 minute. At the end of the extruder, the hot melt was taken off as a strand, cooled in a water bath and granulated.

Process 5: Stirrer Head/cast Slab Single-stage Process

The polyester, in which 20 ppm (with respect to the polyester) of titanyl acetylacetonate had been dissolved as a catalyst, was heated to 180° C. and was mixed by means of a stirrer (2000 rpm) with the butanediol and the 4,4'-diphenylmethane diisocyanate (60° C.) in a reaction vessel. The product obtained after 1 minute was cast to form a slab and was annealed at 140° C. for 30 minutes. The annealed, cooled slab was cut up and granulated.

The TPU granules were mixed according to the data in Table 2 and were processed to form injection mouldings.

Production of Injection Mouldings

The TPU granules were melted in a D 60 injection moulding machine (worm 32) manufactured by Mannesmann (material temperature about 225° C.) and were moulded to form bars (mould temperature: 40° C.; bar size: 80×10×4 mm) or slabs ((mould temperature: 40° C.; 125× 50×2 mm).

Test Measurements

The hardness was measured according to DIN 53 505, and the 100% modulus was measured according to DIN 53 504.

The shrinkage, which was important for the assessment of injection moulding processability, was measured analogously to DIN 16 770 (Part 3).

The relative longitudinal shrinkage after annealing (80° C./15 hours) of the injection mouldings is given in Table 2 as a percentage of the moulded length.

TABLE 2

Test results

| Test | TPU B/TPU A | | | Properties of the moulding composition | | |
|---|---|---|---|---|---|---|
| | TPU B rigid | TPU A nonrigid | Parts by weight/ parts by weight | Hardness (Shore A) | 100% modulus [MPa] | Shrinkage [%] |
| 1 | TPU 1 | TPU 2 | 90/10 | 84 | 5.1 | 1.1 |
| 2 | TPU 1 | TPU 2 | 70/30 | 76 | 4.5 | 1.9 |
| 3 | TPU 1 | TPU 2 | 50/50 | 76 | 3.7 | 2.3 |
| 4* | TPU 1 | TPU 2 | 45/55 | 74 | 3.9 | 5.8 |
| 5* | TPU 1 | TPU 2 | 40/60 | 75 | 3.8 | 7.0 |
| 6* | TPU 3 | TPU 2 | 50/50 | 82 | 4.2 | 2.7 |
| 7* | TPU 4 | TPU 2 | 50/50 | 76 | 3.7 | 3.5 |
| 8* | | | 100 TPU 5 | 73 | 4.4 | 2.7 |

*comparative examples

TABLE 1

Composition of TPUs

| TPU | TPU polyester | raw molecular weight | materials: [mol] | Chain extender | [mol] | Diisocyanate 1 | [mol] | Hardness | Production process |
|---|---|---|---|---|---|---|---|---|---|
| 1 | butanediol adipate | 2000 | 1.00 | butanediol | 2.5 | MDI | 3.5 | 85 Shore A | Multi-stage process: Process 1 |
| 2 | ethanediol adipate | 1450 | 1.00 | butanediol | 0.9 | MDI | 1.9 | 68 Shore A | Single-stage process: Process 2 |
| 3 | butanediol/ adipate | 2000 | 1.00 | butanediol | 2.4 | MDI | 3.5 | 85 Shore A | Single-stage process: Process 3 |
| 4 | butanediol adipate | 2200 | 1.00 | butanediol | 2.6 | MDI | 3.6 | 85 Shore A | Two-stage process: Process 4 |
| 5 | butanediol adipate | 1800 | 1.00 | butanediol | 1.6 | MDI | 2.6 | 73 Shore A | Single-stage process: Process 5 |

It can be seen from the test results that a nonrigid TPU which exhibits the low shrinkage (<2.5%) required for use in injection moulding, can be obtained by a mixture comprising TPU B according to the invention and with a rigid/nonrigid ratio of 90/10 to 50/50.

Mixtures with a ratio <50/50 exhibit a considerably increased shrinkage (comparative examples 4 and 5), which is no longer acceptable in the injection moulding sector.

Mixtures comprising TPUs of the same hardness but which are not according to the invention (comparative examples 6 and 7) likewise result in increased shrinkage. The TPU which had a Shore A hardness of 75±2 but which was not a (rigid/nonrigid) mixture (comparative example 8) also exhibited increased shrinkage.

What is claimed is:

1. A thermoplastic molding composition having a Shore A hardness, as determined according to DIN 53 505, of 65 to 85, and a low shrinkage, as determined according to DIN 16 770 (Part 3), of lower than 2.5% consisting of a blend of
   A) 5 to 54 parts by weight of a first thermoplastic polyurethane produced from an organic diisocyanate, a substantially linear polyester polyol and/or polyether polyol having a number average molecular weight of 500 to 5000 and a chain extending diol having a molecular weight of 60 to 400, said first thermoplastic polyurethane having a Shore A hardness of 60 to 75, and
   B) 95 to 46 parts by weight of second thermoplastic polyurethane prepared by a continuous process comprising
      a) mixing under high shear an organic diisocyanate with at least one substantially linear polyol having a number average molecular weight of 500 to 5000 selected from the group consisting of polyether polyol and polyester polyol, at a NCO/OH ratio of 2.0:1 to 5.0:1, to form a first mixture, and
      b) enabling the components of said first mixture to react in a reactor at a temperature greater than 120° C., up to a conversion greater than 90% with respect to said polyol, to form an isocyanate-terminated prepolymer, and
      c) mixing said prepolymer with additional organic diisocyanate to attain an NCO/OH ratio of 2.05:1 to 6.0:1 to form a second mixture, and
      d) cooling said second mixture to a temperature lower than 190° C., and
      e) mixing said second mixture continuously with at least one chain extending diol having a molecular weight of 60 to 400, for at most 5 seconds, to obtain a third mixture, and
      f) enabling the components of said third mixture to react continuously in an extruder to form said second thermoplastic polyurethane,
   said second thermoplastic polyurethane characterized in having an NCO:OH ratio of 0.9:1 to 1.1:1 and a Shore A hardness of 76 to 90, said composition characterized in that it is readily de-moldable and in that it exhibits low molding shrinkage in the absence of plasticizer.

2. The composition of claim 1 wherein organic diisocyanate, both occurrences, and independently one of the other, is at least one member selected from the group consisting of 4,4'-diphenylmethane diisocyanate, isophorone diisocyanate, 1,6-hexamethylene diisocyanate, 1,5-naphthalene diisoscyanate and 4,4'-dicyclohexyl diisocyanate.

3. The composition of claim 1 wherein chain extending diol, both occurrences and independently one of the other is at least one member selected from the group consisting of 1,6-hexanediol, 1,4-butanediol, ethylene glycol and 1,4-di(β-hydroxyethyl)-hydroquinone.

* * * * *